Aug. 5, 1952      M. LORES      2,605,960
CORRECTOR DEVICE FOR ROENTGENOLOGIC MEASUREMENTS
Filed March 20, 1951      2 SHEETS—SHEET 2
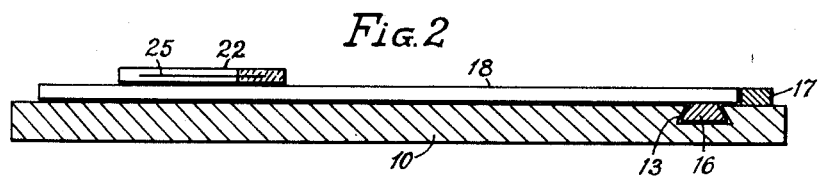
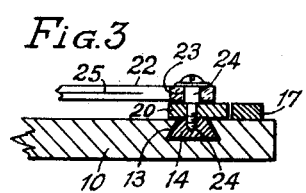
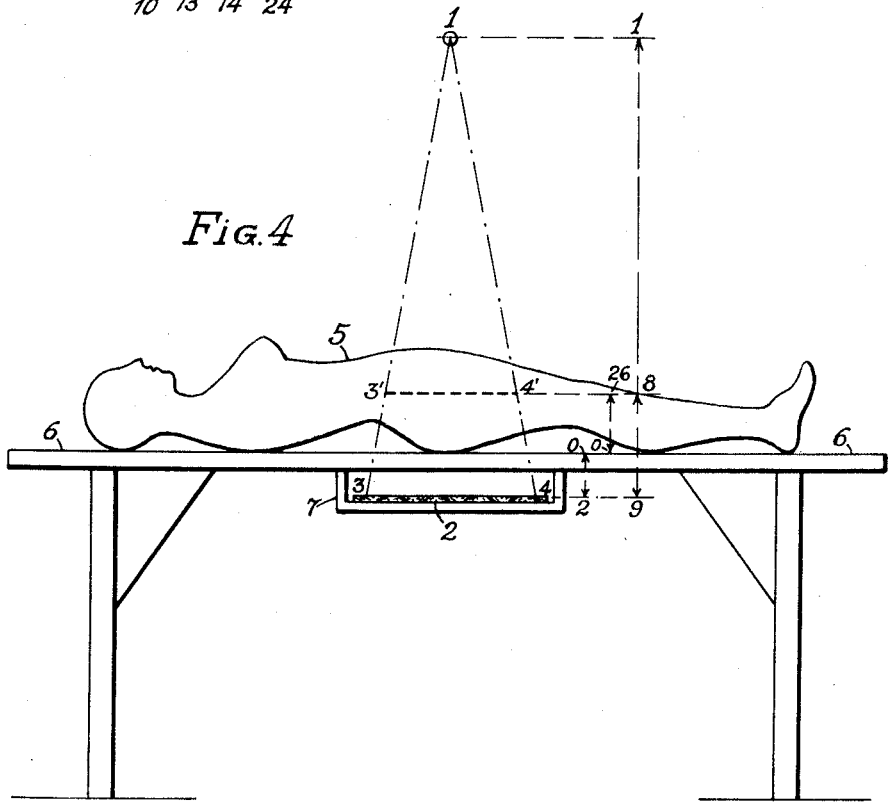
INVENTOR:
Manuel Lores,
BY Singer, Stern & Carlberg,
ATTORNEYS.

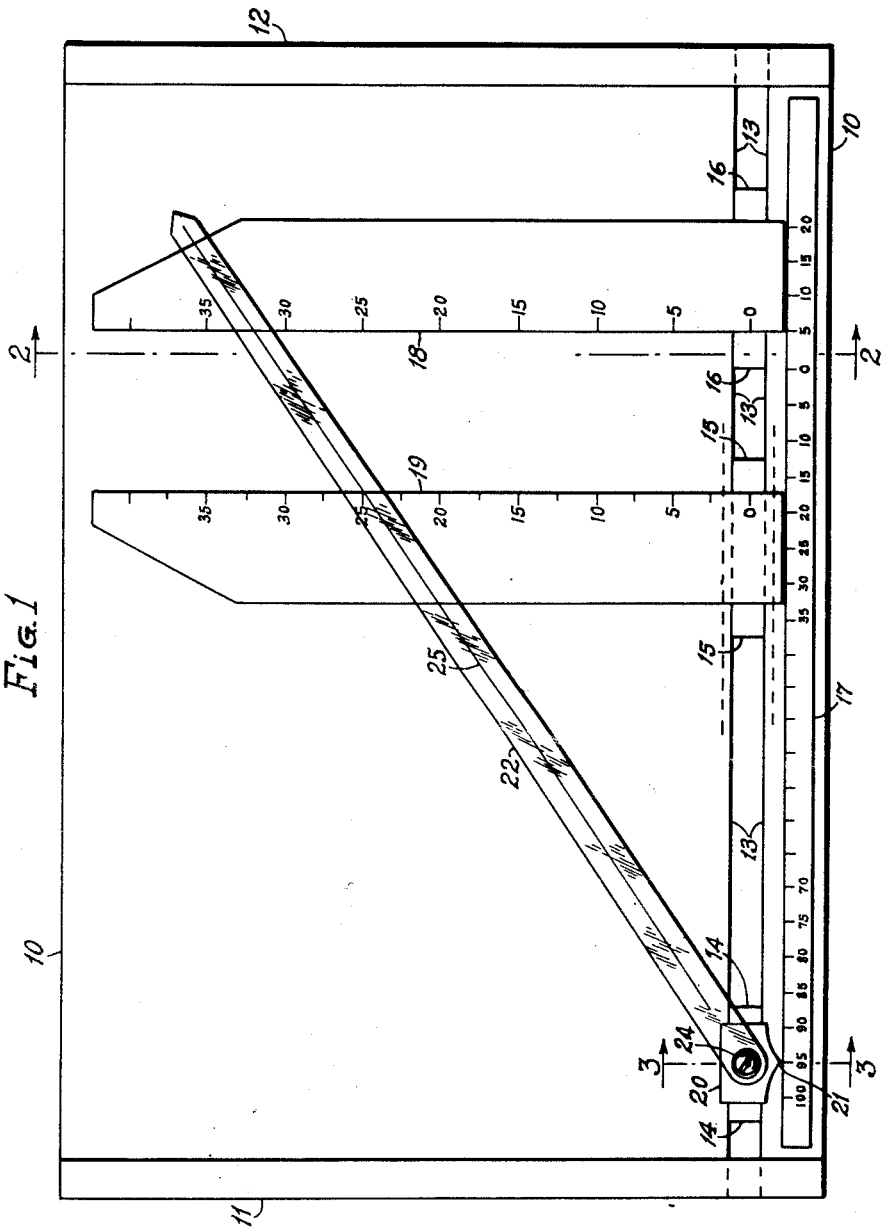

Patented Aug. 5, 1952

2,605,960

UNITED STATES PATENT OFFICE 2,605,960

CORRECTOR DEVICE FOR ROENTGENOLOGIC MEASUREMENTS

Manuel Lores, Miami, Fla.

Application March 20, 1951, Serial No. 216,624

3 Claims. (Cl. 235—61)

This invention relates to corrector devices for roentgenologic measurements, and particularly it relates to the devices commonly used in roentgenologic cephalopelvimetry for obtaining the accurate and direct determination of any pelvis diameter or distance from the corresponding measurement on the X-ray film.

The device disclosed in this application is based on the geometrical principle that: "In similar triangles the bases are directly proportional to their altitudes or heights." Based on this principle and taking advantage of the mathematical fact that any number divided by 100 gives an even decimal, which makes for simpler and more exact calculations, the applicant has devised an easy to make and to operate calculator device which permits by measuring any pelvic diameter or distance on the X-ray film to accurately determine the corresponding diameter or distance in the human pelvis.

The device of this invention comprises a rectangular table provided at its base portion with a longitudinal groove in which are mounted three sliding bars in longitudinal alignment, of which sliding bars the first and second carry a transversal film scale strip and a transversal object scale strip respectively, and the third sliding bar has pivotally mounted thereon a rotating arm adapted to cross the two strip scales referred to. The base edge portion on the table has a scale divided in centimeters, the resting position of the film scale on this base scale being determined by the table top-film distance of the X-ray machine in use, and the resting position of the object scale on said base scale being determined by the object-table top distance of the pelvic diameter under consideration. The base edge scale represents the object-table top distance and the anode-table top distance of the X-ray machine in use. The pivot of the rotating arm represents the anode of the tube of the X-ray machine in use. By adjusting the position of the first and second strip scales along the table base scale, the position of the pivot of the rotating arm according to the position of the tube when the films are taken and the position of the rotating arm when crossing the first strip scale at the point on which ends the diameter or distance taken on the X-ray film, the point on which the rotating arm crosses the second strip scale determines the exact diameter or distance on the object. Thus, this invention permits to make and operate a simple calculator device for determining any pelvic diameter or distance from the corresponding measurement on the X-ray film.

The invention is described by making reference to the figures of the annexed drawings, of which:

Fig. 1 is a top plan view of the device forming the subject matter of this invention.

Fig. 2 is a transverse sectional view on line 2—2 of Fig. 1.

Fig. 3 is a transverse sectional view on line 3—3 of Fig. 1.

Fig. 4 is a schematic view showing the positions of the object and the film on a table to take X-ray photographies and towards which are directed the rays from the tube of an X-ray machine.

This invention is based on the following principle: The rays produced by the Coolidge tube 1 are directed by the target towards the film 2 as a cone 3—1—4. Any object 5 placed parallel to the film 2 in this cone on the top of a table 6 containing the film 2 in a drawer 7 below the table top (Fig. 4) creates a shadow, which is reproduced as its image in the X-ray film 2. Taking the anode of the tube 1 as the apex of the two triangles 3—1—4, 3'—1—4', the rays passing at the ends 3'—4' of the interposed object and at the ends 3—4 of its image as the sides of two similar triangles, the bases of which triangles are the object and its image in the film 2, the following geometrical equations can be constructed because the bases 3'—4' and 3—4 of these triangles are directly proportional to their altitudes 1—8 and 1—9:

$$\frac{3'-4'}{3-4} = \frac{1-8}{1-9}$$

and as $1-8 = (1-9) - (8-9)$, by making the corresponding substitution in the above equation, it results:

$$\frac{3'-4'}{3-4} = \frac{(1-9)-(8-9)}{1-9}$$

and taking a fixed distance 100 cm. for 1—9, $$3'-4' = (3-4)\left(\frac{100-(8-9)}{100}\right)$$

In the above equation, 3'—4', the object, represents the pelvic diameter; 3—4 represents its image in the film; and 8—9 represents the object-film distance.

The factor $$\frac{100-(8-9)}{100}$$

is the factor of magnification. From the last equation one can deduct that the object is directly proportional to its image and to the factor of magnification and because the object-film distance 8—9 is the only variable in the factor of magnification, the object 3'—4' is also a function of the object-film distance 8—9.

Because the object-film distance 8—9 is measured in centimeters and 100 is used as a constant for the anode-film distance 1—9, the factor of magnification decreases by .01 for every increase in 1 cm. for the object-film distance 8—9; thus an error of 1 cm. in the object-film distance 8—9 represents one of .01 in the factor of magnification. The same does not hold true for an error in the image 3—4, which is transmitted in direct proportion to the calculation of the object or true diameter 3'—4'.

Basing on the last equation, I may construct a device comprising a rectangular table 10 which has fixedly superimposed at its ends two cleats 11 and 12. A dovetailed grove 13 extends along the base portion of the table 10 and in this dovetailed groove are lodged three sliding bars of dovetailed cross-section 14, 15 and 16, and on the edge of said base portion of the table 10 is fixed a longitudinal cleat 17 on which is marked a scale in centimeters divided in two scale portions, one right scale portion from a point 0 representing the top surface 0 of the table 6 and which right scale portion represents the table top-film distance 0—2 of the machine in use, and another left scale portion from the point 0 which is divided in 100 centimeters and which represents the anode-film distance 1—9. On the sliding bar 16 is fixed a transversal strip having a scale 18 and on the sliding bar 15 is fixed a transversal strip having a scale 19, both scales 18 and 19 being divided in centimeters from two points 0 at the same transverse line. On the sliding bar 14 is pivoted by the intermediate of a block 20 having an index 21 at the middle of its base, a rotating arm 22 traversed through a hole 23 by the smooth surface of a screw pivot 24 screwed in the sliding bar 14. Thus, the arm 22 can rotate to be adjusted in a suitable position on the scale 18 by means of a hair line 25 with which it is provided and which is seen through the transparent body of said arm 22.

The operation of the device is as follows: As the movable film scale 18 represents the length or diameter 3—4 of the image on the film 2, its resting position is determined by the table top-film distance 0—2 of the machine in use, which is set as an example in 5 centimeters on the right scale portion of the base scale marked on cleat 17. The movable object scale 19 represents the object diameter 3'—4' under consideration, and its resting position is determined by the object-table top distance 0—26. The base scale portion marked on cleat 17 at the left from the zero represents the table top-anode distance 0—1, and the position of the pivot 24 thereon is determined by the position of the tube anode 1 when the film is taken, and which has been set as 95 centimeters in the example shown in Fig. 1.

Then, when the hair line 25 of the rotating arm 22 is adjusted to the measured film diameter 3—4 of the film scale 18, the point where the hair line 25 crosses the true diameter scale 19 is the figure for the true or corrected diameter 3'—4'.

All diameters, distances and fetal skull circumference in the lateral view take by the X-ray machine on the patient are in the mid-plane, therefore, their object-table top distance is half of the intertrochanteric diameter, as measured directly on the patient, and is the same for all of them.

In calculating the transverse diameters as measured in the antero-posterior film, the object-table top distance of the diameter under consideration is its corrected distance as determined from the lateral film.

The circumferences of the fetal skull and fetal skull diameters are corrected using the same scale that are used for the diameters of the pelvis.

It is evident that the device of this invention may be used for correcting purposes in taking an X-ray photography of any other osseus cavity of human body different from the pelvis, and that certain modifications of this device are possible without altering the essential character of the invention, within the broad scope and spirit of the following claims.

I claim:

1. A corrector device for roentgenologic measurements, comprising a table carrying on its base a scale in length units divided in two opposed scale portions from a common point zero, one of which scale portions represents the anode-table top distance of the X-ray machine in use and the other scale portion represents the table top-film distance of the X-ray machine in use, two transverse strips spaced apart and slidingly mounted on said table base scale, each strip carrying a scale in length units, one of the latter scales representing the film diameter and the other representing the object diameter, a bar rotatably mounted by a pivot on a supporting block slidingly mounted on said table base scale, and adapted to cross the scales on said two strips, said pivot representing the tube anode of the X-ray machine in use, means of adjusting the position of the two strip scales each on a scale portion of the base scale above mentioned from the point zero thereof, and means of adjusting the position of the pivot of the rotatable bar at the upper division end of the base scale portion representing the anode-table top distance of the machine in use.

2. A corrector device for roentgenologic measurements, comprising a table carrying on its base a scale in length units divided in two opposed scale portions from a common point zero, one of which scale portions represents the anode-table top distance of the X-ray machine in use and the other scale portion represents the table-top film distance of the X-ray machine in use; two transverse strips spaced apart and slidingly mounted on said base scale, each strip carrying a scale in length units, the right strip scale representing the film diameter and the left strip scale representing the object diameter, a bar rotatably mounted by a pivot on a supporting block slidingly mounted on the upper division end of the base scale portion representing the anode-table top distance of the X-ray machine in use and adapted to cross the scales on said two strips, said pivot representing the tube anode of the X-ray machine in use, means of adjusting the position of the two strips each on a scale portion of the base scale above mentioned and in opposite direction from the point zero thereof, and means of adjusting the position of the pivot of the rotatable bar at the upper division end of the base scale portion representing the anode-table top distance of the machine in use.

3. A corrector device for roentgenologic measurements, comprising a rectangular table having at its base portion a dovetailed groove and having laterally the groove a scale in centimeters divided in two opposed scale portions from a common point zero, the right scale portion representing the table top film distance of the X-ray machine in use and the left scale portion representing the anode-table top distance of the X-ray machine in use, two dovetailed cross-section bars slidingly mounted in said groove and each having secured thereto a transverse strip having a scale in centimeters, of which the right strip scale represents the film diameter and the left strip scale represents the object diameter, a transparent bar having a hair line and rotatably mounted by a pivot on a supporting block secured to a dovetailed cross-section bar slidingly mounted in said groove in front of the upper division end of the base scale portion representing the anode-table top distance of the X-ray machine in use, said pivot representing the tube anode of this machine, the crossed position of the pivoted bar once superimposed on the two strip scales serving to determine the object diameter from the film diameter.

MANUEL LORES.

REFERENCES CITED

The following references are of record in the file of this patent:

UNITED STATES PATENTS

| Number | Name | Date |
|---|---|---|
| 920,450 | Frohne | Mar. 4, 1909 |
| 2,469,672 | Wartinen | May 10, 1949 |
| 2,485,777 | Rogers | Oct. 25, 1949 |
| 2,575,328 | Bardach | Nov. 20, 1951 |

FOREIGN PATENTS

| Number | Country | Date |
|---|---|---|
| 445,399 | France | Nov. 9, 1912 |